US012766845B2

(12) United States Patent
Fukumoto et al.

(10) Patent No.: US 12,766,845 B2
(45) Date of Patent: Oct. 20, 2026

(54) INK JET PRINTING APPARATUS, METHOD OF MANAGING REMAINING AMOUNT OF INK, AND STORAGE MEDIUM

(71) Applicant: CANON KABUSHIKI KAISHA, Tokyo (JP)

(72) Inventors: Takuji Fukumoto, Tokyo (JP); Shodai Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 18/797,985

(22) Filed: Aug. 8, 2024

(65) Prior Publication Data

US 2025/0065654 A1 Feb. 27, 2025

(30) Foreign Application Priority Data

Aug. 24, 2023 (JP) ................................ 2023-136304

(51) Int. Cl.
*B41J 2/175* (2006.01)

(52) U.S. Cl.
CPC ............ *B41J 2/17566* (2013.01); *B41J 2/175* (2013.01); *B41J 2002/17569* (2013.01); *B41J 2002/17573* (2013.01)

(58) Field of Classification Search
CPC .................... B41J 2/17566; B41J 2/175; B41J 2002/17569; B41J 2002/17573
See application file for complete search history.

(56) References Cited

U.S. PATENT DOCUMENTS

| | | | | |
|---|---|---|---|---|
| 9,604,464 | B2 | 3/2017 | Honoki | |
| 9,868,293 | B2 | 1/2018 | Honoki | |
| 10,265,964 | B2 | 4/2019 | Honoki | |
| 10,611,165 | B2 | 4/2020 | Honoki | |
| 11,097,551 | B2 | 8/2021 | Honoki | |
| 11,724,506 | B2 | 8/2023 | Abe | |
| 2005/0195231 | A1 * | 9/2005 | Kasamatsu | .......... B41J 2/17566 347/14 |
| 2016/0214392 | A1 | 7/2016 | Honoki | |
| 2017/0274665 | A1 | 9/2017 | Honoki | |
| 2018/0222208 | A1 | 8/2018 | Honoki | |
| 2019/0184711 | A1 | 6/2019 | Honoki | |
| 2020/0230970 | A1 | 7/2020 | Honoki | |
| 2022/0040991 | A1 | 2/2022 | Honoki | |

FOREIGN PATENT DOCUMENTS

| | | |
|---|---|---|
| JP | 2016-132217 A | 7/2016 |

* cited by examiner

*Primary Examiner* — Geoffrey S Mruk
(74) *Attorney, Agent, or Firm* — Venable LLP

(57) ABSTRACT

An ink jet printing apparatus includes an ink tank that stores ink and can be replenished with ink, a head that discharges ink supplied from the ink tank, a notification unit configured to perform notification to a user in a case where the remaining amount of ink is smaller than a first threshold value, a cancellation unit configured to cancel a notification state by a user operation, the notification state being a state in which the notification is performed by the notification unit, and an estimation unit configured to estimate whether ink is replenished in a case where the notification state is canceled by the cancellation unit.

20 Claims, 11 Drawing Sheets

[INK REMAINING AMOUNT SENSING TIMING]

[AFTER NOTIFICATION CANCELLATION]

| INK REMAINING AMOUNT SENSING TIMING | CONTROL TABLE (1) | CONTROL TABLE (2) |
|---|---|---|
| AT SOFTWARE-ON | NOTIFIED | NOTIFIED |
| BEFORE CLEANING | NOTIFIED | NOTIFIED |
| AFTER CLEANING | NOTIFIED | NOTIFIED |
| AT EACH SHEET DISCHARGE | NOTIFIED | NOT NOTIFIED |
| AT NOTIFICATION CANCELLATION OPERATION | NOT NOTIFIED | NOT NOTIFIED |
| AFTER JOB END | NOTIFIED | NOTIFIED |

FIG.6

INK JET PRINTING APPARATUS, METHOD OF MANAGING REMAINING AMOUNT OF INK, AND STORAGE MEDIUM

BACKGROUND OF THE INVENTION

Field of the Invention

The present disclosure relates to management of the remaining amount of ink in an ink jet printing apparatus.

Description of the Related Art

Conventionally, an ink jet printing apparatus including a mechanism with which ink is manually injected into an ink tank has been provided. An ink jet printing apparatus of this kind includes a component configured to estimate whether ink is replenished by sensing opening and closing of a body cover or an ink tank cover. Another ink jet printing apparatus includes an ink remaining amount sensor configured to output a remaining amount signal in accordance with the amount of ink in an ink tank.

Japanese Patent Laid-Open No. 2016-132217 (Patent Document 1) discloses a technology of querying a user about whether ink has been injected in a case where a remaining amount signal indicating that the amount of ink is equal to or larger than a remaining amount threshold value is output by an ink remaining amount sensor and it is estimated based on the position of a cover or the like that ink injection is performed.

However, with the technology disclosed in Patent Document 1, the user is queried about whether ink is replenished and thus needs to reply to the query. Accordingly, the number of operations at ink replenishment increases, which is cumbersome for the user.

The present disclosure is intended to provide an ink jet printing apparatus capable of estimating whether ink replenishment is performed while maintaining usability.

SUMMARY OF THE INVENTION

An ink jet printing apparatus according to the present disclosure includes an ink tank that stores ink and can be replenished with ink, a head that discharges ink supplied from the ink tank, a notification unit configured to perform notification to a user in a case where the remaining amount of ink is smaller than a first threshold value, a cancellation unit configured to cancel a notification state by a user operation, the notification state being a state in which the notification is performed by the notification unit, and an estimation unit configured to estimate whether ink is replenished in a case where the notification state is canceled by the cancellation unit.

Further features of the present invention will become apparent from the following description of exemplary embodiments with reference to the attached drawings.

BRIEF DESCRIPTION OF THE DRAWINGS

FIG. 6 is a diagram illustrating ink remaining amount sensing timings and notification timings;

DESCRIPTION OF THE EMBODIMENTS

Embodiments of the present disclosure will be described below with reference to the accompanying drawings. The relative disposition, apparatus shapes, and the like of constituent components of an apparatus used in the embodiments below are merely exemplary, and the present invention is not limited thereto. In the accompanying drawings, identical or similar components are denoted by the same reference number, and duplicate description is omitted.

First Embodiment (Exterior Configuration of Printer 100)

Figure 1A:
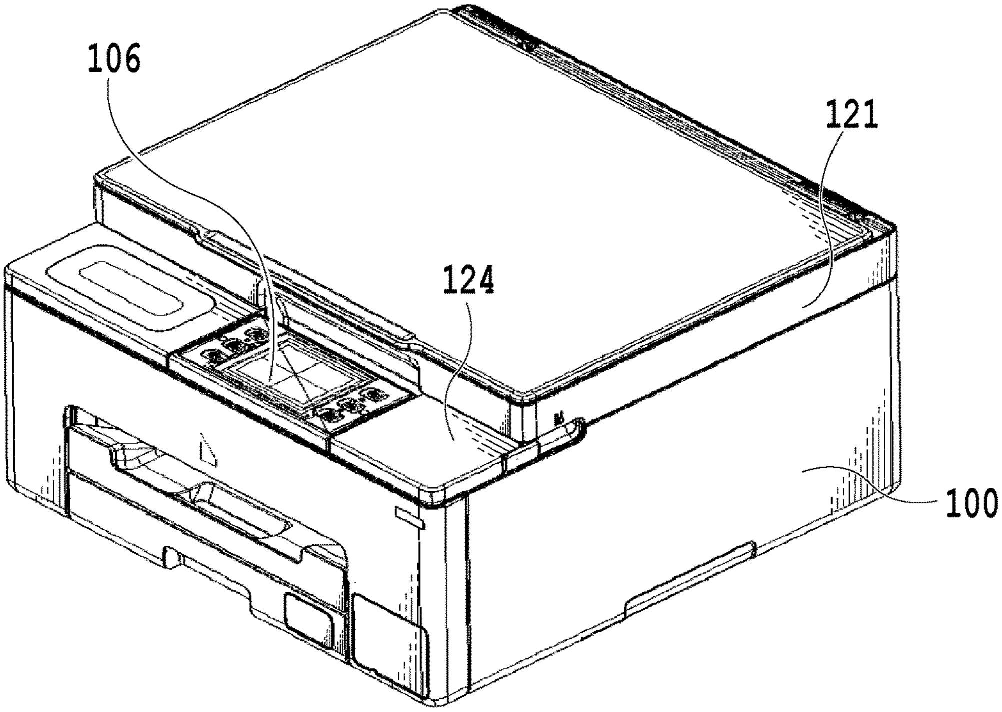
FIGS. 1A and 1B are perspective views illustrating the exterior of a printer.
Figure 1B:
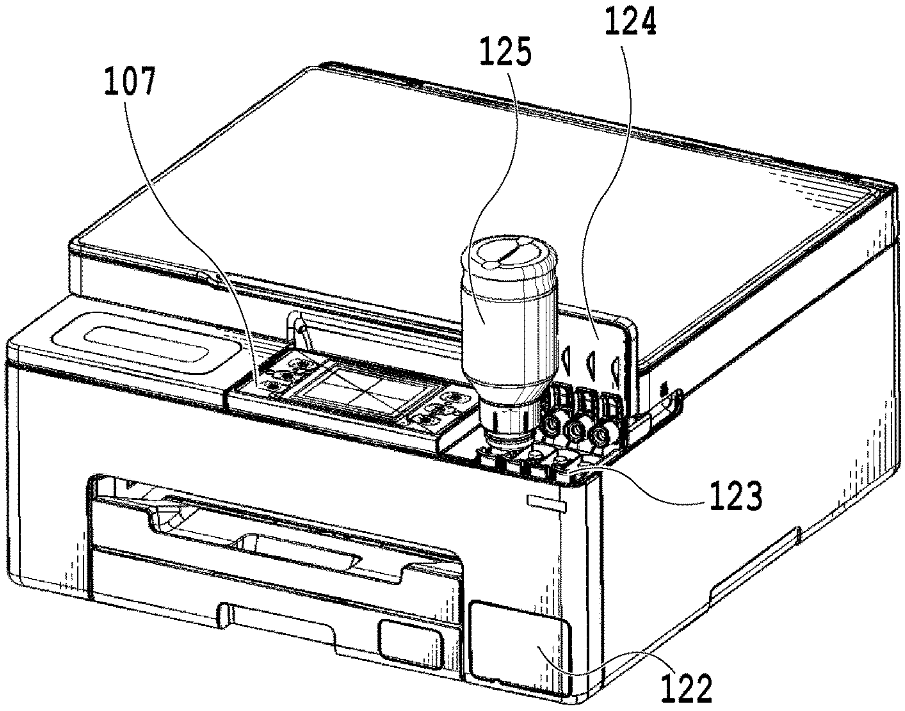

The configuration of a printer 100 as an embodiment of an ink jet printing apparatus of the present disclosure will be described below. FIGS. 1A and 1B are perspective views illustrating the exterior of the printer 100 as the embodiment of the ink jet printing apparatus of the present disclosure. FIG. 1A illustrates a state in which an ink tank cover 124 is closed, and FIG. 1B illustrates a state in which the ink tank cover 124 is opened and ink is injected.

In the present embodiment, an example in which the ink jet printing apparatus has a print function, a scanner function, a copy function, and the like will be described. The print function is implemented by a printer unit 308 (FIG. 3), and the scanner function is implemented by a scanner unit 310 (FIG. 3) to be described later. The copy function is a function to forward image data generated by optically reading a document set on a document table by the scanner unit 310 to the printer unit 308 and print an image on a printing medium such as paper based on the image data by the printer unit 308.

The ink jet printing apparatus is not limited to the printer 100 of the present embodiment but may be, for example, a copier or a facsimile or may be a printer having no scanner function.

As illustrated in FIG. 1A, a top surface of the printer 100 is provided with, for example, a body cover 121, a display unit 106, and the ink tank cover 124. The inside of a printer body can be accessed with the body cover 121 is opened.

An ink tank 122 of each of C, M, Y, and K colors is provided below the ink tank cover 124. The ink tank 122 is provided with, for example, a transparent or semi-transparent window member so that an approximate amount of ink can be visually presumed from the outside. With the ink tank cover 124 is opened, an ink injection port 123 of the ink tank 122 of each color is exposed as illustrated in FIG. 1B. The ink injection port 123 is provided with a cap. For injecting ink into the ink tank 122, a user opens the ink tank cover

124, opens the cap provided with the ink injection port 123, and supplies ink from an ink bottle 125.

In the printer 100 of the present embodiment, the body cover 121 is provided with a non-illustrated opening-closing sensor, and opening and closing of the body cover 121 are sensed by the opening-closing sensor. However, no sensor configured to sense opening and closing is mounted on the ink tank cover 124 and the ink injection port 123. Thus, a CPU 301 cannot recognize, with a sensor or the like, whether the user opens the ink tank cover 124 and the ink injection port 123 and replenishes ink.

(Configurations of Ink Jet Head 206 and Ink Tank 122)

Figure 2:
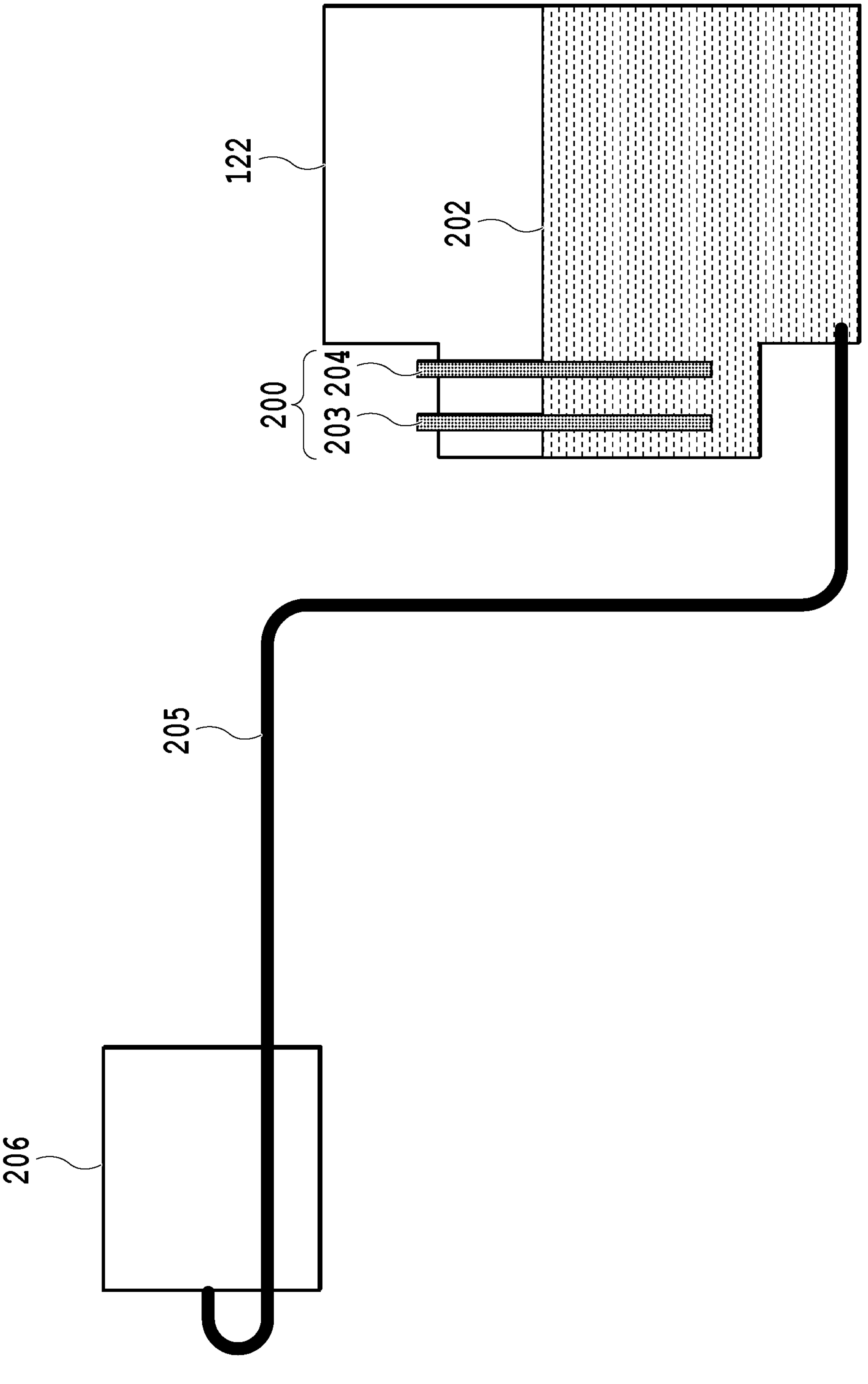
FIG. 2 is a diagram illustrating a schematic configuration of an ink remaining amount sensing sensor in an ink tank.

FIG. 2 is a diagram illustrating schematic configurations of an ink jet head 206 and the ink tank 122. In the following, description will be made for ink of one color to omit duplicate description, but the number of ink colors is not limited to one.

As illustrated in FIG. 2, ink 202 is accumulated in the ink tank 122. The ink tank 122 is connected to the ink jet head 206 of the printer unit 308 through a tube 205. Accordingly, the ink 202 is supplied from the ink tank 122 to the ink jet head 206 through the tube 205 and discharged.

(Ink Remaining Amount Sensor 200)

An ink remaining amount sensor 200 configured to sense whether ink remains in the ink tank 122 is provided at the ink tank 122. The ink remaining amount sensor 200 includes a pair of electrodes 203 and 204, and the pair of electrodes 203 and 204 are provided in a state in which the electrodes can contact the ink 202 inside the ink tank 122. The ink remaining amount sensor 200 obtains, for example, voltage that is potential difference between voltage application to the electrodes 203 and 204 and end of the application, compares this electric information with a reference value, and outputs a signal indicating existence of the remaining amount of ink in the ink tank 122 to the CPU 301.

Specifically, the ink remaining amount sensor 200 outputs, to the CPU 301, a signal indicating, for example, "1" in a case where the remaining amount of ink in the ink tank 122 is equal to or larger than a predetermined certain amount (hereinafter referred to as a sensor threshold value), or for example, "0" in a case where the remaining amount of ink is smaller than the sensor threshold value.

The ink remaining amount sensor 200 described in the present embodiment is a sensor in the scheme of sensing the remaining amount of ink by using the above-described electrodes 203 and 204 but may be a sensor of any other scheme having a configuration with which it is possible to obtain information on existence of the remaining amount of ink equal to or larger than a certain amount in the ink tank 122.

In terms of sensor lifetime and standby electric power reduction, the ink remaining amount sensor 200 with the electrodes 203 and 204 is controlled to sense existence of the remaining amount of ink only at limited timings set in advance. However, a configuration in which existence of the remaining amount of ink is constantly sensed is also applicable. Management of the remaining amount of ink will be described later in detail.

(Configuration of Control System of Printer 100)

Figure 3:
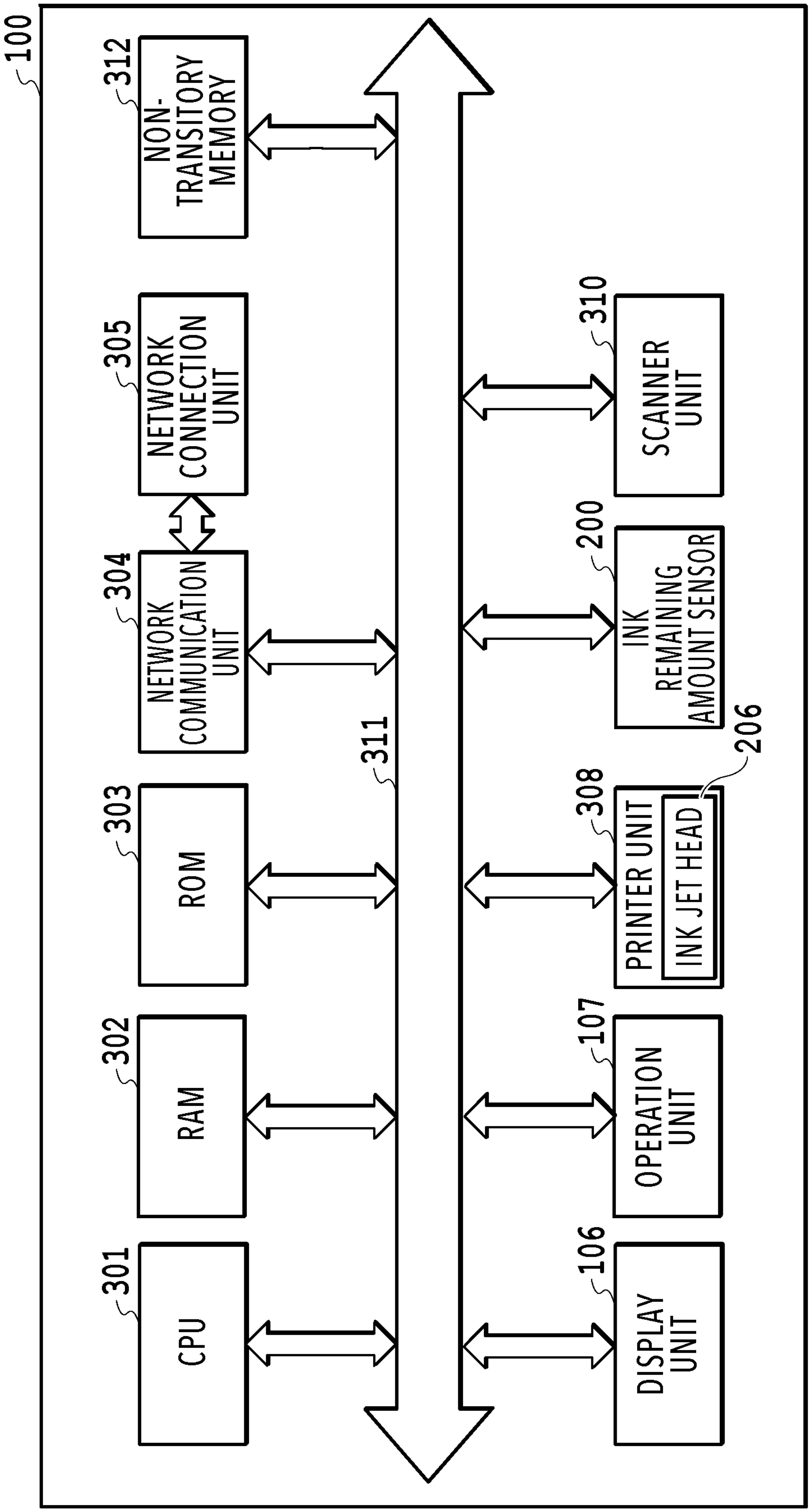
FIG. 3 is a block diagram illustrating the configuration of a control system of the printer.

FIG. 3 is a block diagram illustrating the configuration of a control system of the printer 100. As illustrated in FIG. 3, the printer 100 includes the CPU 301, a RAM 302, a ROM 303, a network communication unit 304, the display unit 106, an operation unit 107, the printer unit 308, the ink remaining amount sensor 200, the scanner unit 310, and a non-transitory memory 312. These components are mutually connected through a bus 311.

Under control by the CPU 301, the printer unit 308 prints an image on a printing medium such as a print sheet by an ink jet scheme based on, for example, image data received from the outside or image data read from the scanner unit 310.

The scanner unit 310 optically reads a document set on the document table (not illustrated) and converts the document into electronic data. Further, the scanner unit 310 transmits image data converted into a designated file format to an external apparatus through a network and stores the image data in a non-transitory memory 312 such as a HDD or a memory card.

The CPU 301 is a control unit configured to collectively control the entire printer 100. The CPU 301 executes various kinds of processing by using the RAM 302 as a work area in accordance with a computer program held in the ROM 303 or the non-transitory memory 312.

The ROM 303 stores a control program of the printer 100, various kinds of functions, a computer program for executing processing to be described later, and various kinds of data necessary for computer program execution. The RAM 302 includes a work memory region used for the CPU 301 to execute processing and an image storage region in which image data and the like are temporarily stored. The non-transitory memory 312 is a non-transitory storage region such as a HDD or a memory card and holds, for example, computer programs and an OS according to the present embodiment.

The display unit 106 is constituted by a touch panel display or the like, displays characters, figures, indicators, and the like, and also functions an operation unit that receives an input operation by the user. The operation unit 107 includes switches, hardware keys, and other input instruments for the user to perform various input operations.

The network communication unit 304 establishes communication connection to a network such as a LAN, a WAN, or the Internet through a network connection unit 305 such as a router. In various kinds of communication, communication control is performed in accordance with communication protocols such as HTTP and XMPP. The communication protocols are not limited thereto, but any other protocol may be used. For example, image data received by the network communication unit 304 from the outside through a network is stored in the RAM 302. The above-described components are mutually connected through the bus 311 and can mutually transmit and receive data.

(Functional Configuration of Printer 100)

Figure 4A:
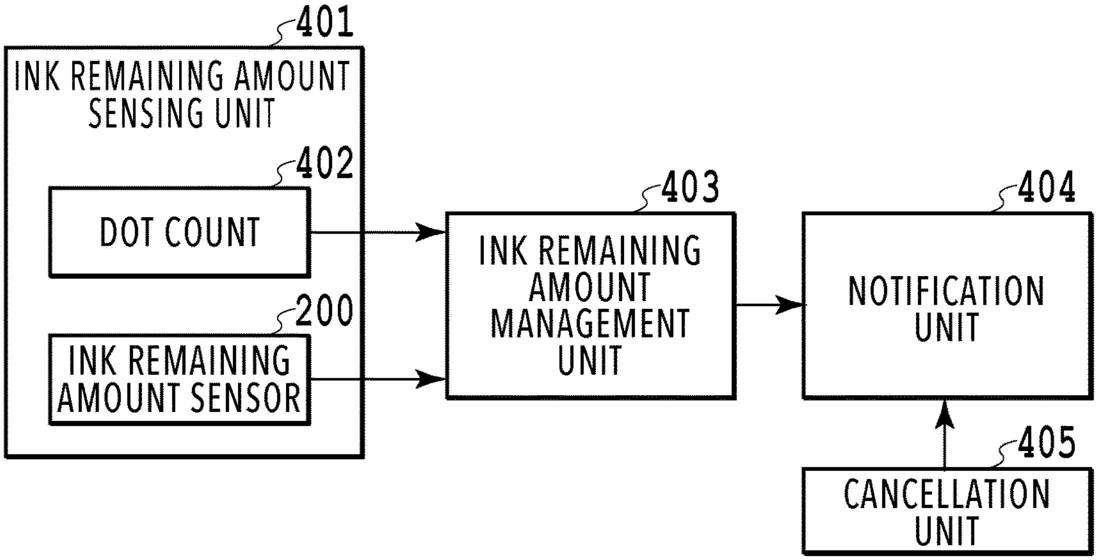
FIGS. 4A and 4B are diagrams illustrating a functional configuration of the printer.

A functional configuration of the printer 100 will be described below with reference to FIGS. 4A and 4B. FIG. 4A is a diagram illustrating the functional configuration of the printer 100 at an ink remaining amount sensing timing, and FIG. 4B is a diagram illustrating the functional configuration of the printer 100 at a timing after notification of necessity of ink replenishment is canceled.

Figure 4B:
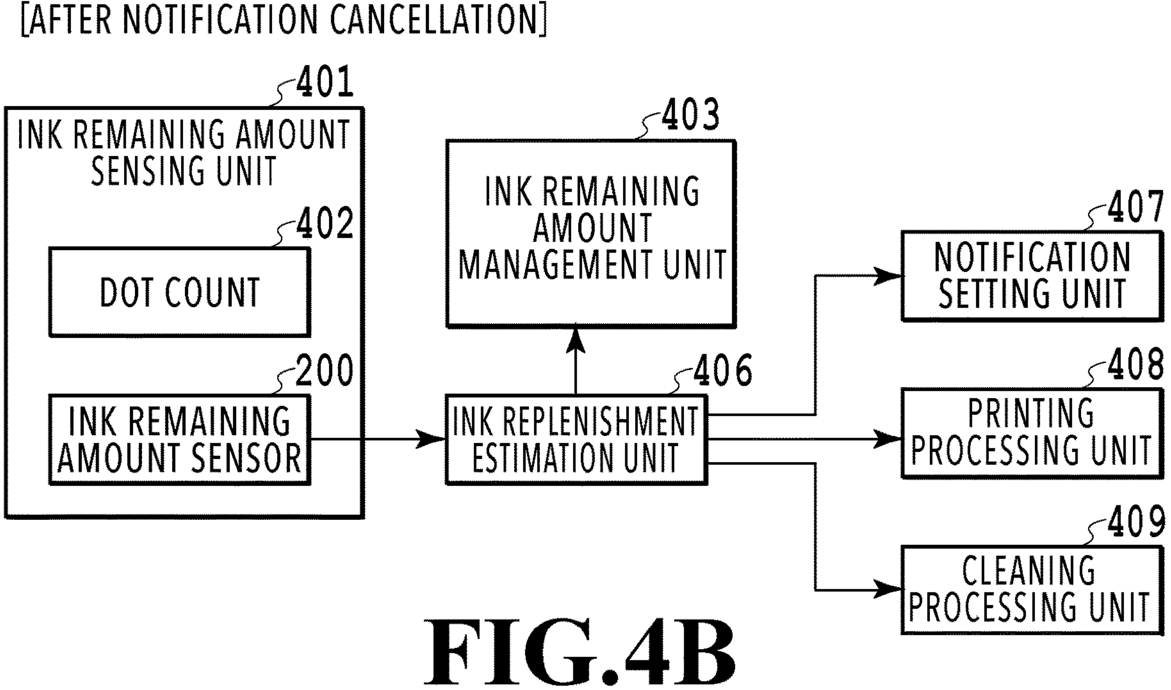

As illustrated in FIGS. 4A and 4B, the printer 100 includes an ink remaining amount sensing unit 401, an ink remaining amount management unit 403, a notification unit 404, a cancellation unit 405, an ink replenishment estimation unit 406, a notification setting unit 407, a printing processing unit 408, and a cleaning processing unit 409.

(Ink Remaining Amount Sensing Unit 401)

The ink remaining amount sensing unit 401 is constituted by the ink remaining amount sensor 200 and a dot count 402. The printer 100 increases the accuracy of ink remaining amount management by using both the ink remaining amount sensor 200 and the dot count 402.

As described above, the ink remaining amount sensor 200 is provided in the ink tank 122 of each ink color and senses whether the remaining amount of ink is equal to or larger than the predetermined sensor threshold value. The printer 100 outputs a remaining amount signal obtained from the ink remaining amount sensor 200 to the ink remaining amount management unit 403.

(Dot Count 402)

The dot count 402 counts the discharged amount of ink from the ink jet head 206 for each ink color, holds a dot count value in the RAM 302, and stores the dot count value in the non-transitory memory 312.

(Ink Remaining Amount Management Unit 403)

The ink remaining amount management unit 403 manages the remaining amount of ink based on the remaining amount signal input from the ink remaining amount sensor 200 and the discharged amount of ink counted by the dot count 402. The management includes processing such as obtainment of the remaining amount signal from the ink remaining amount sensor 200, obtainment of the dot count value, calculation of values related to the remaining amount of ink, and storage and update of the remaining amount of ink. The values related to the remaining amount of ink are values such as an estimated used ink amount to be described later, an ink remaining amount ratio value, and the remaining amount of ink.

The following describes a specific example of processing executed by the ink remaining amount management unit 403 to sense reaching of an ink amount (replenishment threshold value; second threshold value) at which ink replenishment is necessary. The amount of ink in the ink tank 122 decreases as printing is executed from a state in which the ink tank 122 is fully replenished with the ink 202. Meanwhile, the dot count value is added by the dot count 402 as the ink 202 is discharged from the ink jet head 206. The CPU 301 calculates the estimated used ink amount and the ink remaining amount ratio value based on the dot count value and mass per ink dot by Expressions (1) and (2) below.

The estimated used ink amount=the dot count value×mass (g) per ink dot . . . (1)

The ink remaining amount ratio value=100×[(ink amount (g) in an ink-full state)−(the estimated used ink amount (g))]/(ink amount (g) in an ink-full state) . . . (2)

The ink remaining amount ratio value is reset to 100% in a case where the CPU 301 determines (estimates) that ink is replenished. The ink remaining amount ratio value is reset to 100% also in a case where a particular reset operation is performed by the user. The ink remaining amount ratio value is stored in the RAM 302 and the non-transitory memory 312.

The ink remaining amount ratio value is displayed on the display unit 106 and what is called a host instrument such as a personal computer or a smartphone connected through the network communication unit 304. The format of display may be direct display of the ink remaining amount ratio value calculated by Expression (2) or may be display with resolution decreased on a 10-step scale with 10 intervals. Alternatively, the remaining amount of ink may be displayed with further resolution decrease on a three-step scale with three intervals. In such a case, instead of expression of the remaining amount of ink with a numerical value, a schematic diagram illustrating the remaining amount of ink may be drawn and displayed on the display unit 106 and the host instrument.

Figure 5:
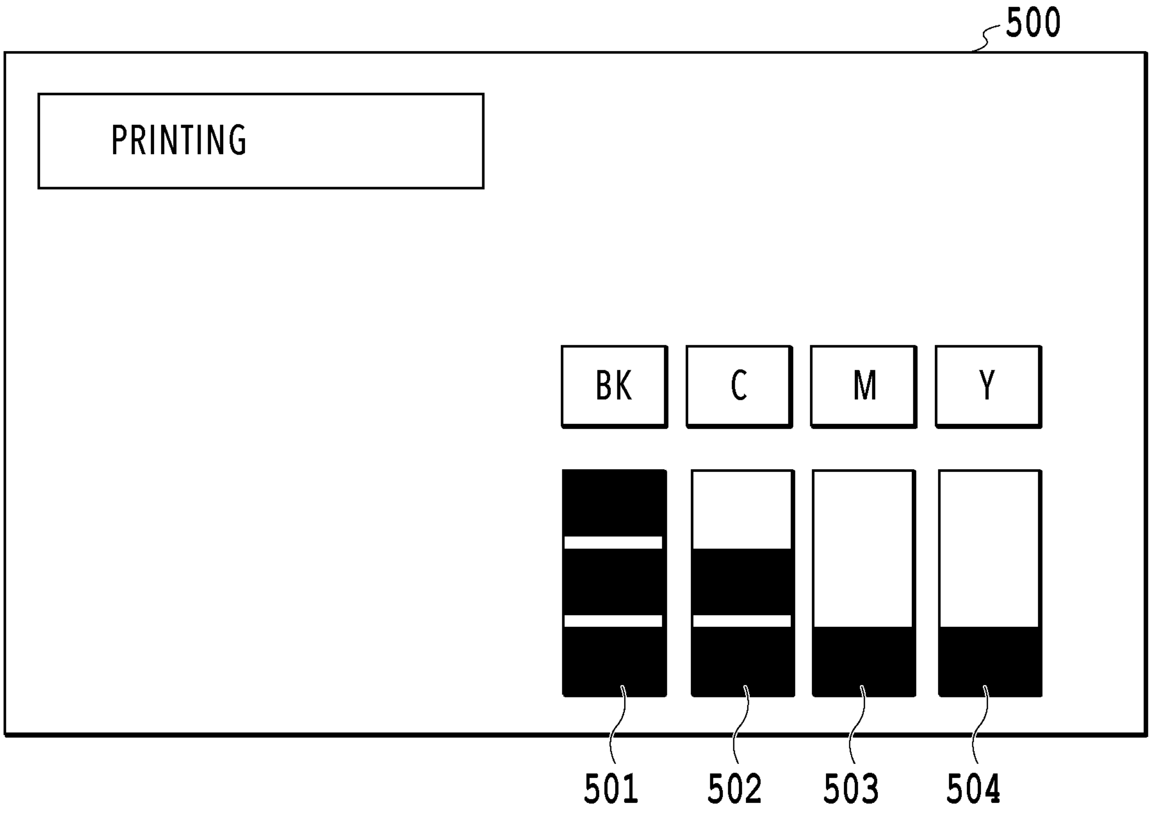
FIG. 5 is a diagram illustrating an example of a display screen displaying the remaining amount of ink.

FIG. 5 is a diagram illustrating an example of a display screen 500 on which the remaining amount of ink is displayed. In the example illustrated in FIG. 5, ink remaining amount displays 501, 502, 503, and 504 by which the remaining amount of ink is indicated at three steps are drawn for the ink colors of BK (black), C (cyan), M (magenta), and Y (yellow). In the drawing, each black region represents the remaining amount of ink. It can be intuitively understood that the remaining amount of ink BK is large and the remaining amounts of ink M and Y are small.

As printing is further executed, the amount of ink in the ink tank 122 decreases to below the sensor threshold value (first threshold value). Accordingly, the ink remaining amount sensor 200 senses that the amount of ink in the ink tank 122 has become smaller than the sensor threshold value, and the CPU 301 is notified thereof.

After the ink remaining amount sensor 200 senses that the amount of ink has decreased to below the sensor threshold value, the CPU 301 manages the remaining amount of ink only with the dot count 402. In this case, the dot count value is added as ink is discharged. The CPU 301 calculates the estimated used ink amount, the ink remaining amount ratio value, and the remaining amount of ink based on the dot count value and mass per ink dot. The remaining amount of ink is a value obtained by subtracting the estimated used ink amount from the amount of ink in an ink-full state (100%).

Then, in a case where the dot count value counted after the ink remaining amount sensor 200 senses that the amount of ink has become below the sensor threshold value exceeds a predetermined value, the CPU 301 (ink remaining amount management unit 403) determines that the amount of ink has decreased to an amount at which ink replenishment is necessary. The ink amount at which ink replenishment is necessary is referred to as a replenishment threshold value (second threshold value). The replenishment threshold value is a value calculated based on the designed value of the discharged amount of ink and set in advance for each ink color.

(Ink Amount at which Ink Replenishment is Necessary)

The ink amount (replenishment threshold value) at which ink replenishment is necessary is different depending on a printer configuration and is an ink amount that does not satisfy an ink amount minimum necessary for performing printing. The ink amount at which ink replenishment is necessary is an ink amount corresponding to 0% as the ink remaining amount ratio value on a 100-step scale in the present embodiment. The ink remaining amount ratio value is 0% or less in some cases depending on the timing of calculation of the ink remaining amount ratio value. In the present specification, the ink remaining amount ratio value is regarded as the ink amount at which ink replenishment is necessary in a case where calculated to be 0% or less than 0%.

A printed object is blurred or not printed if printing is continued while the ink amount (replenishment threshold value) at which ink replenishment is necessary is not satisfied. Furthermore, air enters the head 206 from the ink tank 122, which degrades printing quality and potentially causes failure. Thus, the CPU 301 interrupts printing processing or head cleaning processing being executed in a case where the remaining amount of ink is smaller than the replenishment threshold value.

(Case where Ink Replenishment is not Performed Despite Ink Amount at which Ink Replenishment is Necessary)

However, with a configuration including the ink tank 122 with a semi-transparent window part as in the printer 100 of the present embodiment, the remaining amount of ink in the ink tank 122 can be visually checked by the user. Thus, the user visually presumes the remaining amount of ink, compares the remaining amount of ink with the remaining amount of printing, and prioritizes current printing work without immediately performing ink replenishment in some cases.

Difference occurs in some cases between the ink remaining amount ratio value and the remaining amount of ink calculated by the dot count 402 and the ink remaining amount ratio value and the remaining amount of ink sensed by the ink remaining amount sensor 200 in a case where the amount of ink has decreased below a certain amount. In such a case, the ink remaining amount management unit 403 may perform processing of correcting the dot count value. For example, the remaining amount of ink calculated by the dot count 402 is equal to or larger than the sensor threshold value, but the remaining amount signal from the ink remaining amount sensor 200 indicates a value smaller than the sensor threshold value.

Since the ink remaining amount estimation at the dot count 402 includes error, the remaining amount of ink is not necessarily accurately estimated in some cases. Factors of the error include error caused by difference in the amount of ink evaporation due to use environment such as temperature, and sensing error of the ink remaining amount sensor 200 attributable to oblique installation of the printer.

The above-described correction of the dot count value will be described below. An ink amount as the sensor threshold value for the ink remaining amount sensor 200 can be determined based on attachment positions of the electrodes 203 and 204 of the ink remaining amount sensor 200 in the ink tank 122. The printer 100 holds, in the RAM 302 and the ROM 303 in advance, the amount of ink and the ink remaining amount ratio value in a case where the ink remaining amount sensor 200 senses that the amount of ink has decreased to below the sensor threshold value. For example, the ink remaining amount ratio value at the sensor threshold value is larger than 0% and is, for example, 20%.

In a case where inconsistency occurs between the ink remaining amount ratio value calculated based on the ink remaining amount sensor 200 and the ink remaining amount ratio value calculated by the dot count 402, the ink remaining amount ratio value calculated by the dot count 402 is rewritten with the ink remaining amount ratio value sensed by the ink remaining amount sensor 200. Accordingly, the ink remaining amount ratio value is corrected to a more accurate value.

(Ink Remaining Amount Sensing Timings)

Timings of sensing the remaining amount of ink will be described below. Ink remaining amount sensing by using both the ink remaining amount sensor 200 and the dot count 402 is performed at a plurality of timings set in advance. FIG. 6 is a diagram for description of timings of the ink remaining amount sensing by using both the ink remaining amount sensor 200 and the dot count. Obtainment of the remaining amount signal by the ink remaining amount sensor 200, counting of the dot count value by the dot count 402, and management of the remaining amount of ink by the ink remaining amount management unit 403 are performed for each ink color. The following description will be made on one color for simplification of description.

As described above, obtainment of the remaining amount signal from the ink remaining amount sensor 200 is performed only at predetermined timings. The dot count 402 counts the dot count value each time ink is discharged.

The timings of the ink remaining amount sensing by using both the ink remaining amount sensor 200 and the dot count 402 are defined on the left column in FIG. 6. Control tables (1) and (2) are tables that define whether to perform notification to the user in a case where a state in which ink replenishment is necessary is detected at the timings listed on the left column. The control tables (1) and (2) indicate that two kinds of control patterns are selectively executed by the CPU 301.

As illustrated in FIG. 6, the ink remaining amount sensing timings are defined to be timings at software-on, before cleaning, after cleaning, after each sheet discharge, at a notification cancellation operation, after job end. Processing of the ink remaining amount sensing by using both the ink remaining amount sensor 200 and the dot count 402 is performed at these timings irrespective of whether the control table (1) or (2) is set. In a case where the state in which ink replenishment is necessary is sensed by the ink remaining amount sensing processing, whether to perform notification is different depending on which control table is set. Notification timings will be described later.

The ink remaining amount sensing timings illustrated in FIG. 6 include timings before and after the user performs ink-consuming work such as a printing job or head cleaning. At these timings, notification is performed to prompt ink replenishment to the user in a case of the ink amount at which ink replenishment is necessary.

The timing at software-on is a timing at which software of the printer 100 is turned on (state in which various kinds of software such as a control program are executed after power-on). The timing before cleaning is a timing before start of cleaning processing performed by using ink to prevent ink fixation at the head 206 and an ink flow path to the head 206. The timing after cleaning is a timing after end of cleaning processing.

The timing after each sheet discharge is a timing each time the printer 100 executes printing of a plurality of sheets and discharges one printed object. The timing after job end is a timing after the last one sheet of a printing job is printed and discharged. The timing of the notification cancellation operation is a timing at which a notification state is canceled by a user operation through the operation unit 107 or a touch panel operation of the display unit 106 in a case where the above-described notification for necessity of ink replenishment is performed.

The purpose of performing the ink remaining amount sensing although notification is not performed at the notification cancellation operation is to estimate whether ink is replenished by the user. A printer having a configuration in which no opening-closing sensor is provided at the ink tank cover 124 as in the printer 100 of the present embodiment cannot estimate timings of ink replenishment based on opening and closing of the ink tank cover 124. However, change in the amount of ink in the ink tank 122 can be obtained by performing the ink remaining amount sensing in a case where an operation to cancel the notification state is performed, and it can be estimated that ink is replenished by the user in a case where the change is present.

As described above, the ink remaining amount management unit 403 calculates the ink remaining amount ratio value at the ink remaining amount sensing timings set in advance and determines whether the amount of ink is the ink amount at which ink replenishment is necessary based on the ink remaining amount ratio value (FIG. 4A). In this case, the ink remaining amount management unit 403 can sense whether the amount of ink has actually increased from the ink amount (replenishment threshold value) at which ink replenishment is necessary by obtaining the remaining amount signal from the ink remaining amount sensor 200. Accordingly, whether ink replenishment is performed by the user can be estimated.

In a case where an operation to cancel the notification state is performed, the ink remaining amount sensing unit 401 senses whether ink is replenished by the ink remaining amount sensor 200 (FIG. 4B). The ink remaining amount ratio value of at least one color is equal to or smaller than 0% in a state in which a notification screen is displayed on the display unit 106. In a case where the user replenishes ink of the color and performs an operation to cancel the notification screen, a signal indicating equal to or larger than the sensor threshold value is obtained by the ink remaining amount sensing performed at the timing of cancellation.

In this case, the CPU 301 (ink replenishment estimation unit 406) estimates that ink of the color is replenished and resets the ink remaining amount ratio value to the ink-full state (100%). In a case where the user cancels a notification screen 700 without replenishing ink of the color, a signal indicating smaller than the sensor threshold value is obtained by the ink remaining amount sensing performed at the timing of cancellation. Thus, the CPU 301 (ink replenishment estimation unit 406) estimates that ink of the color is not replenished. In this case, the ink remaining amount ratio value of the color is not reset but is maintained at the original value (0%). In the present embodiment, it is exemplary to reset the remaining amount of ink to the ink-full state (100%) in a case where it is estimated that ink is replenished. For example, in a situation in which only an ink bottle with which 50% of the ink tank can be replenished is available in markets, the remaining amount of ink may be reset to an ink-half state (50%) in a case where it is estimated that ink is replenished. Thus, the present embodiment is widely applicable to a form in which the remaining amount of ink is reset to a state with a predetermined amount.

The ink remaining amount sensing timings in FIG. 6 are exemplary, and the present invention is not limited to these timings. The ink remaining amount sensing processing is performed for every ink color at the ink remaining amount sensing timings. However, the ink remaining amount sensing by the ink remaining amount sensor 200 after the notification cancellation operation (at a key operation) may be performed only for an ink color for which the remaining amount signal obtained from the ink remaining amount sensor 200 before the notification state is canceled is a signal indicating smaller than the sensor threshold value. This processing will be described in detail in a second embodiment.

(Notification Unit 404)

The notification unit 404 obtains a value related to the remaining amount of ink and managed by the ink remaining amount management unit 403, for example, the ink remaining amount ratio value and notifies necessity of ink replenishment at predetermined timings in a case where the obtained ink remaining amount ratio value is smaller than the replenishment threshold value (second threshold value). However, at a particular timing among the above-described predetermined timings, notification to the user is not performed even in a case where the ink remaining amount ratio value is smaller than the predetermined replenishment threshold value. Hereinafter, notification timings will be described below.

In a case where the control table (1) is set by the notification setting unit 407 to be described later, in a case where the state in which ink replenishment is necessary is sensed at a timing at software-on, before execution of cleaning processing (hereinafter referred to as head cleaning) of the ink jet head 206, after execution of the head cleaning, after each sheet discharge, or after job end, the CPU 301 (notification unit 404) notifies the sensing to the user. At the timing of the notification cancellation operation, the CPU 301 does not perform notification to the user even if the state in which ink replenishment is necessary is sensed.

In a case where the control table (2) is set by the notification setting unit 407 to be described later, in a case where the state in which ink replenishment is necessary is sensed at a timing at software-on, before execution of the head cleaning, after execution of the head cleaning, or after job end, the CPU 301 (notification unit 404) notifies the sensing to the user. After each sheet discharge or at the notification cancellation operation, notification to the user is not performed even if the state in which ink replenishment is necessary is sensed.

Thus, between the control table (1) and the control table (2), the ink remaining amount sensing timings are the same but notification timings are different. Specifically, in a case where the state in which ink replenishment is necessary is sensed at the timing after each sheet discharge to be described later, notification is performed in a case where the control table (1) is set, but notification is not performed in a case where the control table (2) is set. The reason for this will be described later. The method of notification is, for example, display of the notification screen 700 indicating necessity of ink replenishment on the display unit 106.

Figure 7:
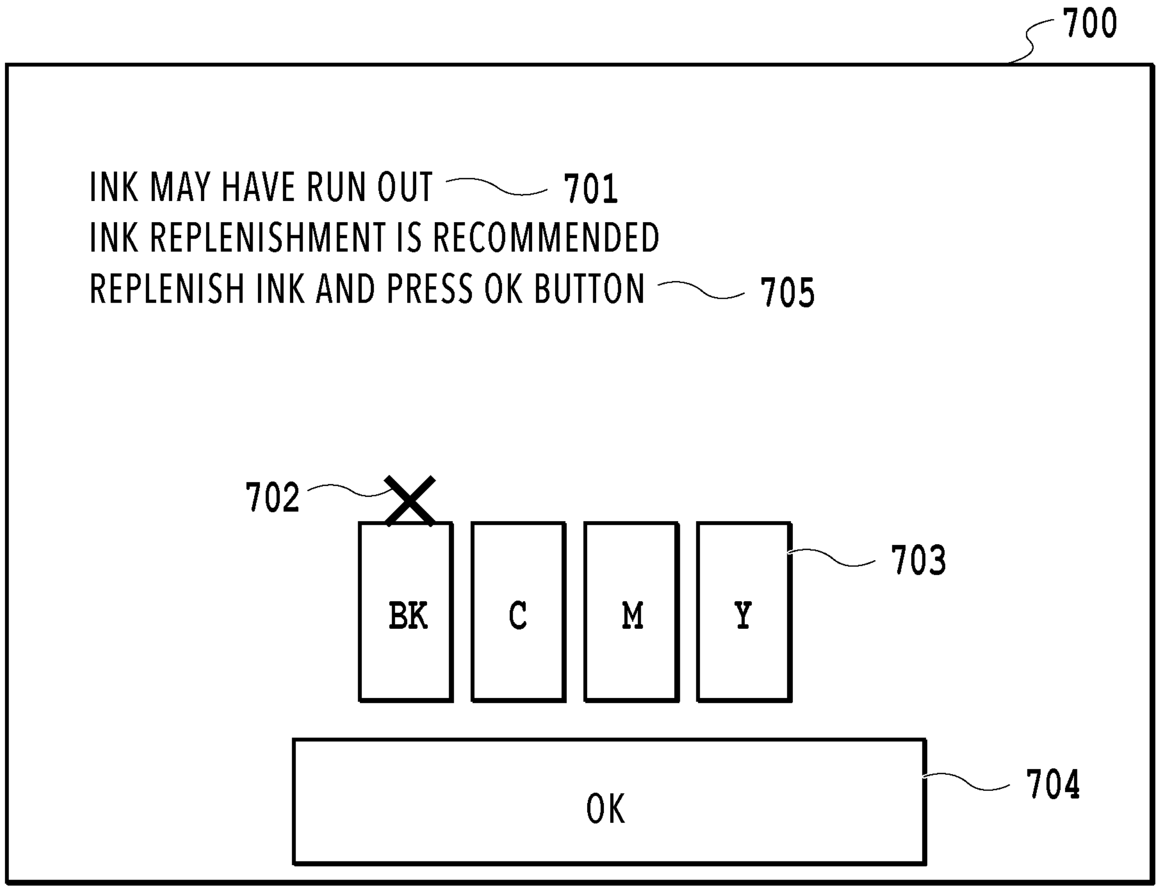
FIG. 7 is a diagram illustrating an example of a notification screen notifying necessity of ink replenishment.

FIG. 7 is a diagram illustrating an example of the notification screen 700.

As illustrated in FIG. 7, the notification screen 700 indicates a text 701 for necessity of ink replenishment and an ink color (corresponding color) in which ink replenishment is necessary. In the example illustrated in FIG. 7, a mark 702 such as "x" is illustrated at one of schematic figures 703 representing the respective colors to indicate that the remaining amount of ink in the corresponding color is insufficient. In addition, a text 705 that prompts to replenish ink in the corresponding color and press down an OK button is displayed. Display of the notification screen 700 is continued until a cancellation operation is performed by the user. The cancellation operation is performed by, for example, an operation of the operation unit 107 or a touch panel of the display unit 106.

(Cancellation Unit 405)

The cancellation unit 405 cancels the notification state by the notification unit 404 in a case where a particular operation for canceling the notification state is performed by the user. The particular operation is, for example, an operation of an OK button 704 on the notification screen 700 but not limited to this operation. For example, the notification screen 700 may be canceled (deleted) by shifting the printer 100 to a software-off state by any other operation of a button provided at the operation unit 107 or the touch panel of the display unit 106.

For example, the printer 100 can be shifted to the software-off state by operating a power button provided at the operation unit 107. For example, in a case where the user does not have the ink bottle 125 for replenishment, the printer 100 can be shifted to the software-off state to perform ink replenishment later. In addition, temporary non-display of the notification screen 700 with a cancellation button provided at the operation unit 107 is the above-described particular operation.

(Ink Replenishment Estimation Unit 406)

The ink replenishment estimation unit 406 obtains the remaining amount signal from the ink remaining amount sensor 200 in a case where the notification state is canceled by the cancellation unit 405, and estimates whether ink is replenished based on the obtained remaining amount signal. Specifically, the ink replenishment estimation unit 406 estimates that ink is replenished in a case where the remaining amount signal obtained from the ink remaining amount sensor 200 is “1”, in other words, a signal indicating that the amount of ink is equal to or larger than the sensor threshold value.

The ink replenishment estimation unit 406 estimates that ink is not replenished in a case where the remaining amount signal obtained from the ink remaining amount sensor 200 is “0”, in other words, a signal indicating that the amount of ink is smaller than the sensor threshold value.

The ink replenishment estimation unit 406 performs, for each ink color, estimation of whether ink replenishment is performed. For example, the ink replenishment estimation unit 406 obtains the remaining amount signal from the ink remaining amount sensor 200 for an ink color (corresponding color) in which necessity of ink replenishment is notified by the notification unit 404. In a case where the remaining amount signal of the corresponding color is “1”, in other words, a signal indicating that the amount of ink is equal to or larger than the sensor threshold value, the ink replenishment estimation unit 406 estimates that ink in the corresponding color is replenished by the user.

In this case, the CPU 301 resets the ink remaining amount ratio value of the corresponding color, which is managed by the ink remaining amount management unit 403, to the ink-full state (100%). In addition, the CPU 301 initializes the dot count value of the corresponding color to zero. Further, the CPU 301 resumes processing (printing processing or cleaning processing) interrupted before the notification screen 700 is displayed.

In a case where the remaining amount signal of the corresponding color is “0”, in other words, a signal indicating that the amount of ink is smaller than the sensor threshold value, the ink replenishment estimation unit 406 estimates that ink in the corresponding color is not replenished by the user. In this case, the CPU 301 keeps the ink remaining amount ratio value and the dot count value of the corresponding color, which are managed by the ink remaining amount management unit 403. Then, the CPU 301 switches notification control to the control table (2) in FIG. 6. Setting information related to switching of the control tables is stored for each ink color in the RAM 302 and the non-transitory memory 312. Thereafter, the CPU 301 resumes processing (printing processing or cleaning processing) interrupted before the notification screen 700 is displayed.

According to the present embodiment, only with an operation to cancel display of the notification screen 700, the notification screen 700 is canceled, the remaining amount of ink is sensed by the ink remaining amount sensor 200, existence of ink replenishment is estimated, the ink remaining amount ratio value is reset or continued in accordance with an estimation result, and printing processing or cleaning processing being interrupted is resumed. Thus, the user does not need to manually select nor input whether ink is replenished, and can smoothly use the printer 100 with a smaller number of operations.

(Notification Setting Unit 407)

The notification setting unit 407 sets notification timings at which notification processing is executed in accordance with an estimation result by the ink replenishment estimation unit 406. Specifically, the notification timings are changed between a case where it is estimated that ink is replenished and a case where it is estimated that ink is not replenished. Notification processing is set not to be performed irrespective of an ink replenishment estimation result at a timing at which the notification state is canceled.

In a case where it is estimated by the ink replenishment estimation unit 406 that ink is not replenished, the notification setting unit 407 reduces the notification timings as compared to a case where it is estimated that ink is replenished. Specifically, the notification setting unit 407 sets notification not to be performed at a particular timing in a case where it is estimated by the ink replenishment estimation unit 406 that ink is not replenished. The particular timing is, for example, the timing “after each sheet discharge” (timing at which a printed object is discharged) as indicated in the control table (2) in FIG. 6.

Thereafter, in a case where it is sensed by the ink remaining amount sensor 200 that the amount of ink is equal to or larger than the sensor threshold value at any ink remaining amount sensing timing, the notification setting unit 407 switches the notification setting to the control table (1). Specifically, notification is set to be performed at all notification timings including the timing after each sheet discharge.

The reason for switching the control tables will be described below. As described above, in the present embodiment, printing can be continued without ink replenishment even in a case where the ink amount at which ink replenishment is necessary is reached. However, through continuously use without ink replenishment, air enters the head 206 from the ink tank 122, which degrades printing quality and potentially causes failure. Thus, the remaining amount of ink need to be continuously managed.

However, if notification is frequently performed at the timing after each sheet discharge, for example, the user needs to perform a notification cancellation operation each time, which interferes with work. Thus, switching is performed to the control table (2) in FIG. 6 to reduce notification timings. Accordingly, at the timing after each sheet discharge, the remaining amount of ink is managed by performing ink remaining amount sensing, and even in a case where ink replenishment is necessary, notification of the necessity is omitted. Accordingly, it is possible to sense the remaining amount of ink at appropriate timings and perform notification at appropriate frequency, which improves usability.

Notification timings are controlled by using the control tables in the present embodiment but may be controlled by using a flag without using tables. In a case where the OK button 704 on the notification screen 700 in FIG. 7 is pressed down, the CPU 301 sets the flag to “ON” and holds flag information in the RAM 302 or the non-transitory memory 312. While the flag is set to “ON”, the CPU 301 performs control not to perform notification processing at the timing after each sheet discharge. The CPU 301 sets the flag to “OFF” in a case where it is sensed at either timing that the amount of ink is equal to or larger than the sensor threshold value.

(Printing Processing Unit 408)

The printing processing unit 408 controls execution and interruption of printing processing based on a printing job. For example, the printing processing unit 408 interrupts printing processing in a case where the remaining amount of ink managed by the ink remaining amount management unit 403 has become smaller than the replenishment threshold value. The printing processing unit 408 resumes the printing processing in a case where a predetermined notification cancellation operation or the like is performed.

(Cleaning Processing Unit 409)

The cleaning processing unit 409 controls execution and interruption of cleaning processing of the ink jet head 206. For example, the cleaning processing unit 409 interrupts cleaning processing in a case where the remaining amount of ink managed by the ink remaining amount management unit 403 has become smaller than the replenishment threshold value during execution of the cleaning processing. The cleaning processing unit 409 resumes the cleaning processing in a case where a predetermined notification cancellation operation or the like is performed.

(Flowchart of Ink Remaining Amount Sensing Processing)

Processing executed by the printer 100 will be described below.

Figure 8:
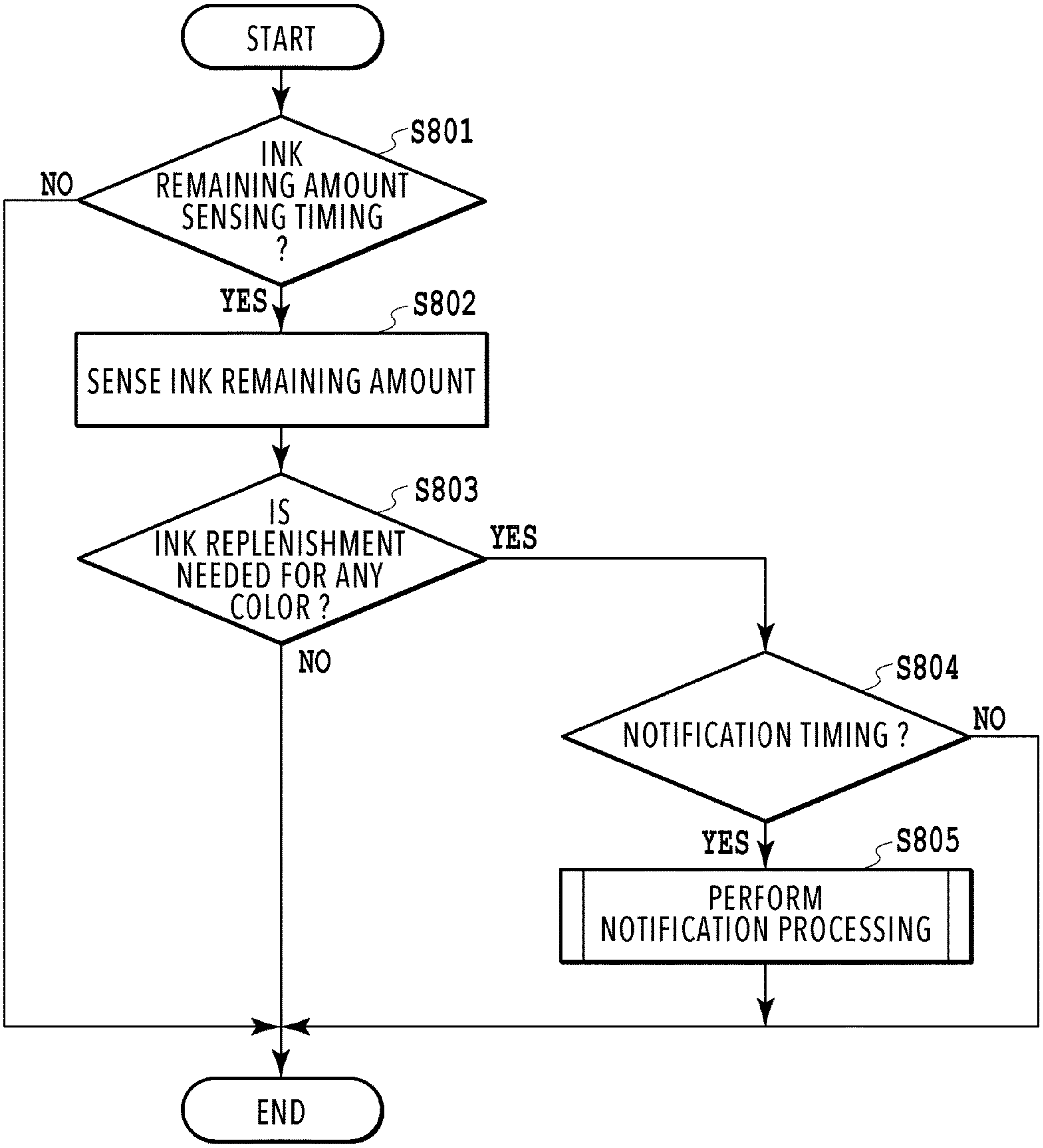
FIG. 8 is a flowchart illustrating the process of processing executed by a CPU at the ink remaining amount sensing timing.

FIG. 8 is a flowchart illustrating the process of processing executed by the CPU 301 at the ink remaining amount sensing timings. The processing illustrated in the present flowchart is implemented, for example, as the CPU 301 calls a computer program stored in the ROM 303, loads the computer program onto the RAM 302, and executes the computer program. The CPU 301 starts the present processing at a predetermined ink remaining amount sensing timing (FIG. 6) after power on. In the following description, symbol "S" means step.

At S801, the CPU 301 monitors whether an ink remaining amount sensing timing illustrated in FIG. 6 is reached. In a case where no ink remaining amount sensing timing is reached (NO at S801), the CPU 301 ends the present flowchart. In a case where an ink remaining amount sensing timing is reached (YES at S801), the CPU 301 proceeds to S802.

At S802, the CPU 301 executes the ink remaining amount sensing processing. The CPU 301 activates the ink remaining amount sensor 200 and obtains the remaining amount signal of each ink color. In addition, the CPU 301 obtains the dot count value of each ink color by the dot count 402 and calculates the values related to the remaining amount of ink such as the ink remaining amount ratio value for each ink color.

At S803, the CPU 301 determines, for each ink color, whether ink replenishment is needed based on the calculated ink remaining amount ratio value.

At S803, in a case where it is determined that ink replenishment is not necessary for any ink color (NO at S803), the CPU 301 ends the present flowchart. In a case where ink replenishment is necessary for at least one color (YES at S803), the CPU 301 proceeds to S804. Hereinafter, an ink color in which ink replenishment is necessary is referred to as a corresponding color.

At S804, the CPU 301 refers to current notification setting information (control table) of the corresponding color, which is stored in the RAM 302 and the non-transitory memory 312, and determines whether the current timing is a timing at which notification is to be performed.

At S804, in a case where it is determined that at least one color is the corresponding color currently at a timing at which notification is to be performed (YES at S804), the CPU 301 proceeds to S805. In a case where no color is at a timing at which notification is to be performed (NO at S804), the CPU 301 ends the present flowchart.

For example, in a case where the current timing is the timing after each sheet discharge and the control table (2) in FIG. 6 is set for each corresponding color by the notification setting unit 407, the CPU 301 ends the present flowchart without performing notification processing since "not notified" is set for the timing after each sheet discharge.

In a case where the current timing is the timing after each sheet discharge and the control table (1) in FIG. 6 is set for any corresponding color by the notification setting unit 407, notification processing (FIG. 9) is executed for each corresponding color since "notified" is set for the timing after each sheet discharge.

In a case where the current timing is any of the timings at software-on, before cleaning, after cleaning, and after job end and ink replenishment is necessary for at least one color (YES at S803), notification processing is executed for each corresponding color despite of which control table is set.

In a case where the current timing is the timing of the notification cancellation operation, the CPU 301 does not execute notification processing (FIG. 9) despite of which of the control tables (1) and (2) is set even in a case where ink replenishment is necessary for any ink color (NO at S803).

Notification setting (control table) is set for each ink color. Thus, for example, in a case where ink replenishment is necessary for BK ink and Cyan ink (YES at S803), whether a notification timing is reached for each of BK ink and Cyan ink is determined by the processing at S804.

In a case where "notified" is set for any color at S804, notification processing at S805 is executed for both colors. In a case where "not notified" is set for both ink colors, the notification processing at S805 is not executed. The reason for executing notification processing for all corresponding colors in a case where "notified" is set for any one of the corresponding colors, is because it is more convenient for the user to be notified of all colors in which ink replenishment is necessary if notification is performed.

In the above description, the processing at S801 to S803 are performed for all colors and the processing at S804 to S805 is performed only for any corresponding color, but the present invention is not limited thereto and the entire flowchart of FIG. 8 may be executed for each ink color.

The processing in FIG. 8 will be described with a specific example. Operation in a case where a printing request of a plurality of sheets is received from the host instrument and printing processing is executed at the printer 100 will be described as an example. Notification setting is set to the control table (1) in FIG. 6 for all colors.

The printer 100 executes printing processing in a case where having received image data as a printing target from the host instrument.

After executing printing of the first sheet and performing sheet discharge, which corresponds to the timing after each sheet discharge in FIG. 6 (YES at S801), the CPU 301 executes the ink remaining amount sensing processing (S803). In the ink remaining amount sensing processing, the CPU 301 activates the ink remaining amount sensor 200 and obtains the remaining amount signal for each ink color. In addition, the CPU 301 obtains the dot count value and calculates the ink remaining amount ratio value.

In a case where the ink remaining amount ratio value is smaller than the replenishment threshold value for any ink color (YES at S803), the CPU 301 proceeds to S804. Since the control table (1) sets "notified" for the timing after each sheet discharge, the CPU 301 proceeds to S805 and transitions to notification processing. The notification processing at S805 will be described below with reference to FIG. 9.

(Flowchart of Notification Processing)

Figure 9:
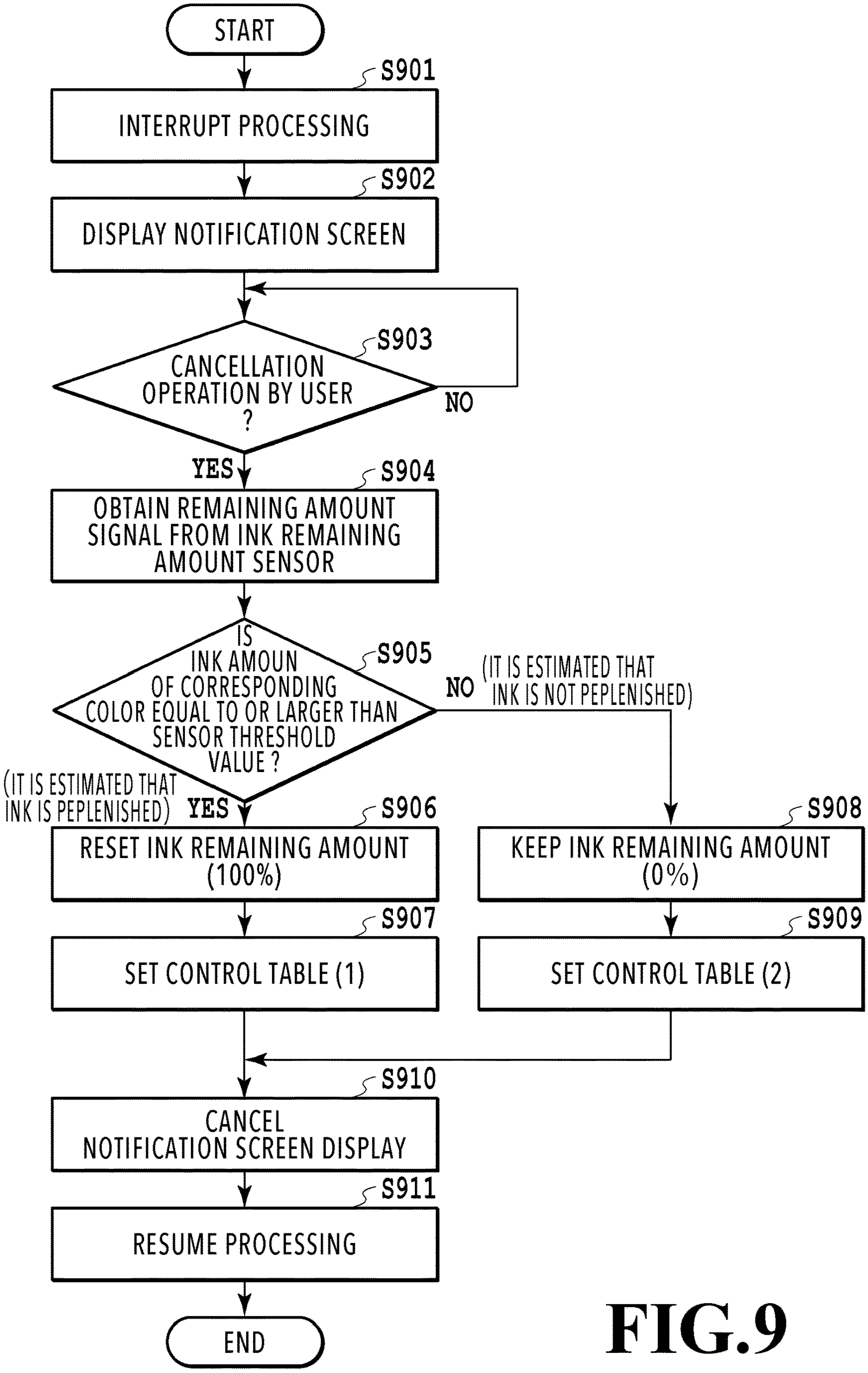
FIG. 9 is a flowchart illustrating the process of notification processing.

FIG. 9 is a flowchart illustrating the process of the notification processing executed at S805 in FIG. 8.

At S901, in a case where processing is being executed, the CPU 301 temporarily interrupts the processing. In the above-described example, printing processing is interrupted.

At S902, the CPU 301 displays the notification screen 700 as illustrated in FIG. 7. The notification screen 700 displays existence of any ink color in which ink replenishment is necessary.

At S903, the CPU 301 waits for the notification cancellation operation by the user. In a case where the notification cancellation operation (OK button 704) is performed by, for example, a user operation on the operation unit 107 or the touch panel of the display unit 106 and an operation signal thereof is obtained (YES at S903), the CPU 301 proceeds to S904. In a case where no cancellation operation is detected (NO at S903), the CPU 301 returns to S903 and waits for the notification cancellation operation.

At S904, the CPU 301 activates the ink remaining amount sensor 200 and obtains the remaining amount signal for each ink color.

At S905, in a case where the remaining amount signal indicating that the amount of ink is equal to or larger than the sensor threshold value is obtained (YES at S905), the CPU 301 estimates that ink is replenished, and proceeds to S906. In a case where the remaining amount signal indicating that the amount of ink is smaller than the sensor threshold value is obtained (No at S905), the CPU 301 estimates that ink is not replenished for the corresponding ink color, and proceeds to S908.

At S906, the CPU 301 resets, to 100%, the ink remaining amount ratio value of a color in which ink replenishment is estimated. At S907, the CPU 301 maintains the control table (1) in FIG. 6 for notification setting for the color. Thereafter, the CPU 301 proceeds to S910.

At S908, the CPU 301 keeps, at 0%, the ink remaining amount ratio value of a color in which no ink replenishment is estimated, and changes notification setting for the color to the control table (2) in FIG. 6 at S909. The CPU 301 stores notification setting information in the RAM 302 and the non-transitory memory 312. Thereafter, the CPU 301 proceeds to S910.

At S910, the CPU 301 cancels (deletes) display of the notification screen 700 on the display unit 106.

At S911, the CPU 301 resumes the processing (printing processing) being temporarily interrupted, and ends the present flowchart.

For example, necessity of replenishment is notified for BK ink and Cyan ink at S902, and the user replenishes only BK ink but not Cyan ink and performs the notification cancellation operation. In this case, the remaining amount signal obtained at S904 is equal to or larger than the sensor threshold value for BK ink and smaller than the sensor threshold value for Cyan ink.

For BK ink, the CPU 301 resets the remaining amount of ink (ink remaining amount ratio value) to 100% and maintains the notification setting at the currently set control table (1). For Cyan ink, the CPU 301 keeps the remaining amount of ink (ink remaining amount ratio value) (0% or smaller) and changes the notification setting to the control table (2).

Thereafter, the notification screen is canceled and printing is resumed. In a case where the next page is printed and discharged, which corresponds to the timing "after each sheet discharge", YES is determined at S801 in the flowchart of FIG. 8 and the remaining amount of ink is sensed for each ink color at S802. The ink remaining amount ratio value is calculated by the ink remaining amount sensor 200 and the dot count 402 and whether replenishment is necessary for any ink color is determined at S803.

In the above-described example, the ink remaining amount ratio value for Cyan ink is equal to or smaller than 0%, and accordingly, YES is determined at S803. Since the notification setting for Cyan ink is set to the control table (2), NO is determined at S804 at the timing "after each sheet discharge" and the flowchart of FIG. 8 ends without executing notification processing.

As described above, according to the printer 100 of the first embodiment, it is possible to maintain usability and estimate whether ink replenishment is performed by the user. Specifically, in a case where the notification cancellation operation is performed by the user, the printer 100 senses the remaining amount of ink by using the ink remaining amount sensor 200. Accordingly, the printer 100 can estimate whether ink is replenished without performing processing of querying the user about whether ink replenishment is performed.

Although ink remaining amount sensing by the ink remaining amount sensor 200 is not to be constantly performed from a viewpoint of sensor lifetime and standby electric power reduction, whether ink is replenished can be estimated at appropriate timings by sensing the remaining amount of ink by using the ink remaining amount sensor 200 at least at the timing of the notification cancellation operation.

Conventionally, it has been difficult for a printer including no mechanism for sensing opening and closing of the body cover and the ink tank cover, in particular, to estimate whether ink replenishment is performed. However, according to the printer 100 of the present embodiment, the remaining amount of ink is sensed by using the ink remaining amount sensor 200 at a timing after notification cancellation at which ink replenishment by the user is anticipated. Accordingly, even a printer including no mechanism for sensing opening and closing of the body cover and the ink tank cover can estimate whether ink replenishment is performed.

In a case where it is estimated that ink is not replenished, the printer 100 of the present embodiment keeps the ink remaining amount ratio value in the current state (0% or smaller) but does not perform the above-described notification at the timing after each sheet discharge. Accordingly, processing such as printing can be efficiently performed without a disadvantage such as printing interruption for the above-described notification at each sheet discharge.

In a case where the amount of ink becomes equal to or larger than the sensor threshold value at either ink remaining amount sensing timing, the ink remaining amount ratio value is reset to 100% and the notification setting is changed to the original setting without a user operation for the printer 100 to recognize that ink is replenished. Thus, in a case where the remaining amount of ink at which ink replenishment is necessary is reached again thereafter, the above-described notification is performed at predetermined notification timings (including the timing after each sheet discharge). Accordingly, ink replenishment notification is performed at appropriate timings and appropriate frequency, which improves usability.

The above embodiment is described with the example in which ink remaining amount sensing by the ink remaining amount sensor 200 and the dot count 402 are combined to perform notification processing in a case where the remaining amount of ink has become smaller than the amount (replenishment threshold value; second threshold value) at which ink replenishment is necessary. However, the notification processing may be performed in a case where the remaining amount signal by the ink remaining amount sensor 200, which indicates that the remaining amount of ink has become smaller than the sensor threshold value (first threshold value) is obtained.

Second Embodiment

In the first embodiment, obtainment of the remaining amount signal from the ink remaining amount sensor 200 at the notification cancellation operation (S904 in FIG. 9) is performed for each ink color. However, obtainment of the remaining amount signal from the ink remaining amount sensor 200 at the timing of the notification cancellation operation may be performed only for an ink color the remaining amount signal (pre-cancellation remaining amount information) of which from the ink remaining amount sensor 200 before the notification state is canceled indicates equal to or smaller than the sensor threshold value.

In this case, the CPU 301 (ink remaining amount management unit 403) holds the remaining amount signal obtained from the ink remaining amount sensor 200 for each color in the RAM 302 before transitioning to the notification state. In a case where the notification cancellation operation is performed by the user, the CPU 301 obtains the remaining amount signal from the ink remaining amount sensor 200 again only for an ink color for which the remaining amount signal held in the RAM 302 indicates smaller than the sensor threshold value, and performs ink replenishment estimation based on the remaining amount signal.

The ink remaining amount sensing processing and the notification processing in the second embodiment will be described below with reference to FIGS. 10 and 11. The configuration of the printer 100 in the second embodiment is the same as in the first embodiment and thus description thereof is omitted.

Figure 10:
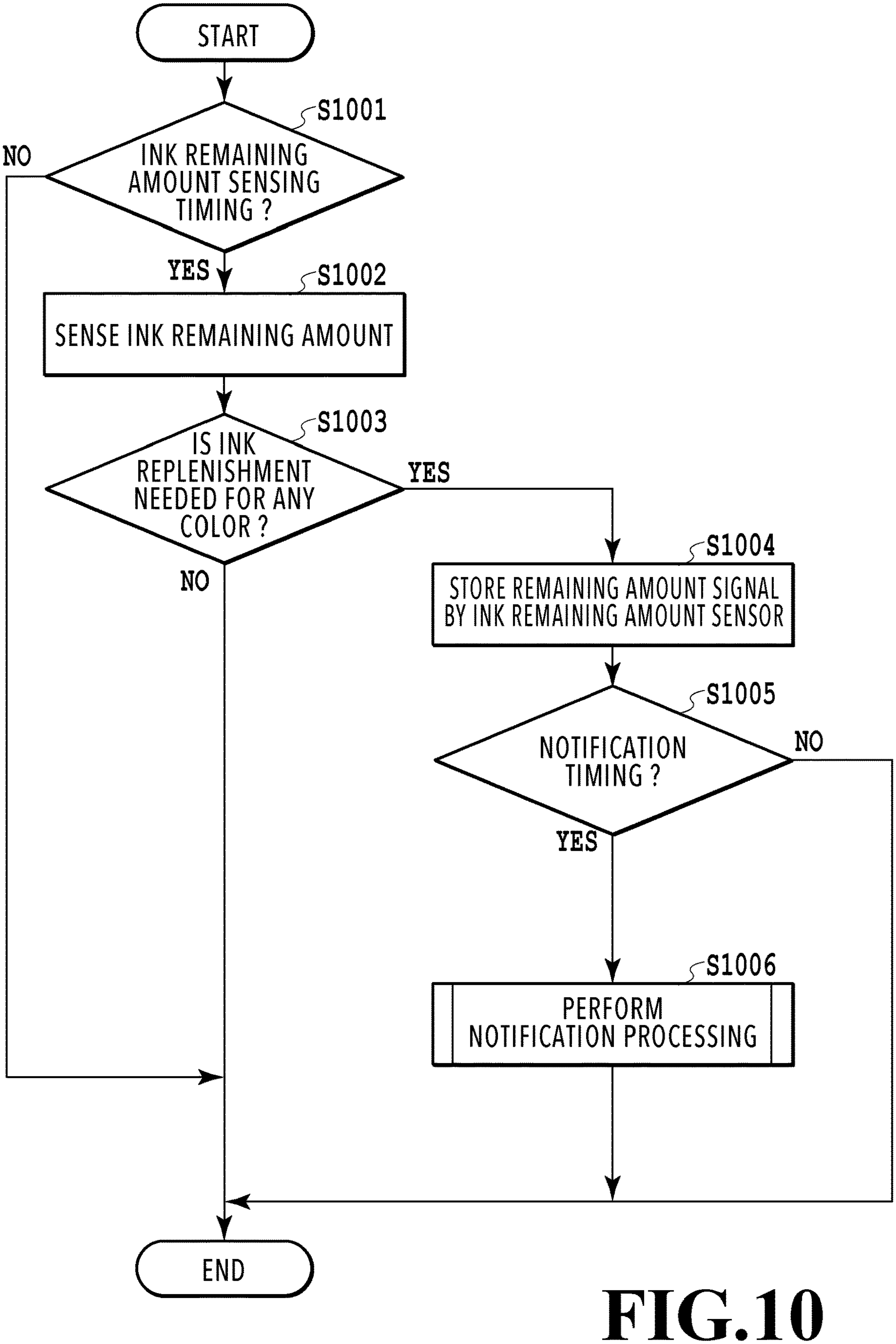
FIG. 10 is a flowchart illustrating the process of processing in a second embodiment.

FIG. 10 is a flowchart illustrating the process of processing executed by the CPU 301 at an ink remaining amount sensing timing. S1001 to S1003 in FIG. 10 are the same as S801 to S803 in FIGS. 8, and S1005 to S1006 in FIG. 10 are the same as S804 to S805 in FIG. 8. In FIG. 10, processing at S1004 is added to the flowchart of FIG. 8.

At S1001, in a case where an ink remaining amount sensing timing is currently reached (YES at S1001), the CPU 301 proceeds to S1002. At S1002, the CPU 301 executes the ink remaining amount sensing processing for each ink color, obtains the remaining amount signal from the ink remaining amount sensor 200, and obtains the dot count value by the dot count 402. The CPU 301 calculates the values related to the remaining amount of ink such as the ink remaining amount ratio value for each ink color.

At S1003, the CPU 301 determines whether ink replenishment is needed for each ink color based on the calculated ink remaining amount ratio value. In a case where ink replenishment is necessary for at least one color (YES at S1003), the CPU 301 proceeds to S1004.

At S1004, the CPU 301 stores the remaining amount signal obtained from the ink remaining amount sensor 200 at S802 in the RAM 302 as pre-cancellation remaining amount information.

Processing at S1005 to S1006 is the same as S804 to S805 in the first embodiment. The CPU 301 refers to the current notification setting (control table) of any corresponding color, which is stored in the RAM 302 and the non-transitory memory 312, and determines whether the current timing is a timing at which notification is to be performed. At S1005, in a case where at least one color is the corresponding color currently at a timing at which notification is to be performed (YES at S1005), the CPU 301 proceeds to S1006. In a case where no corresponding color is at a timing at which notification is to be performed (NO at S1005), the CPU 301 ends the present flowchart.

Figure 11:
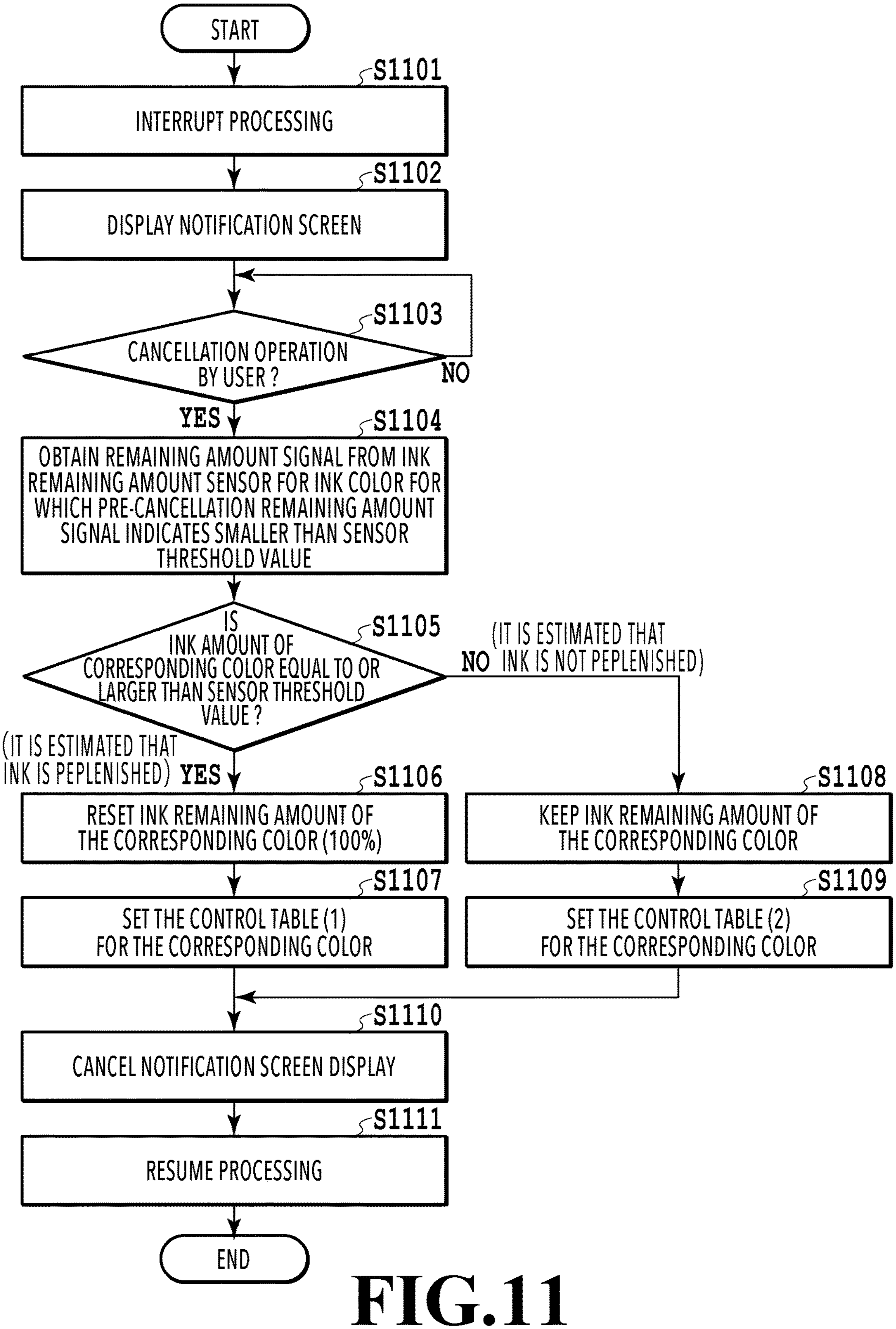
FIG. 11 is a flowchart illustrating the process of notification processing in the second embodiment.

FIG. 11 is a flowchart illustrating the process of the notification processing executed at S1006 in FIG. 10. Processing other than S1104 in the flowchart of FIG. 11 is the same as in the flowchart of FIG. 9. Specifically, S1101 to S1103 are the same as S901 to S903 in FIG. 9, and S1105 to S1111 in FIG. 11 are the same as S905 to S911 in FIG. 9. The following description will be mainly made on S1104, which is processing different from FIG. 9.

In the notification processing, first, processing being executed is interrupted at S1101, and the notification screen 700 is displayed at S1102 to display that an ink color in which ink replenishment is necessary exists.

At S1103, in a case where the notification cancellation operation (OK button 704) is performed and an operation signal thereof is obtained (YES at S1103), the CPU 301 proceeds to S1104.

At S1104, the CPU 301 obtains a pre-cancellation remaining amount signal from the RAM 302. The CPU 301 obtains the remaining amount signal from the ink remaining amount sensor 200 again only for any color for which the obtained pre-cancellation remaining amount signal illustrates smaller than the sensor threshold value.

Difference from the first embodiment is such that although remaining amount sensing by the ink remaining amount sensor 200 is performed for all colors in the first embodiment, remaining amount sensing by the ink remaining amount sensor 200 is performed only for any color in which the amount of ink is smaller than the sensor threshold value before notification cancellation in the second embodiment. The subsequent processing (S1105 to S1111) is performed only for any color for which the remaining amount signal is obtained from the ink remaining amount sensor 200 S1104.

In a case where the remaining amount signal obtained at S1104 indicates equal to or larger than the sensor threshold value (YES at S1105), the CPU 301 estimates that ink of the corresponding color is replenished, and proceeds to S1106. In a case where the remaining amount signal obtained at S1104 indicates smaller than the sensor threshold value (NO at S1105), the CPU 301 estimates that ink of the corresponding color is not replenished, and proceeds to S1108. Processing at S1106 and later is the same as in the first embodiment.

According to the second embodiment, ink remaining amount sensing by the ink remaining amount sensor 200 after the notification cancellation operation is performed only for any ink color in which the amount of ink is smaller than the sensor threshold value before notification cancellation. Accordingly, the number of times of activation of the ink remaining amount sensor 200 can be reduced as compared to a case where ink remaining amount sensing by the ink remaining amount sensor 200 is performed for all colors as in the first embodiment. Thus, it is possible to reduce degradation of the ink remaining amount sensor 200 and reduce electric power consumption.

Third Embodiment

The printer 100 of the first embodiment includes the touch panel display (display unit 106) as a configuration for notifying the remaining amount of ink to the user and performs display in a visually clear manner by using characters, figures, indicators, and the like. The touch panel display also functions as an operation unit through which an input operation is performed. In a third embodiment, the display unit 106 of the printer 100 has a simple configuration including no display but including only an LED lamp. Moreover, the display unit 106 includes no operation unit such as a touch panel, and the operation unit 107 has a simple configuration with hardware keys, buttons, and the like.

The printer 100 notifies the state of the printer 100 to the user with lighting of the LED lamp and a flashing pattern (such as the number of times and color) thereof. The user executes cancellation of the notification state by using the buttons and hardware keys of the operation unit 107.

The configuration of the printer 100 except for the display unit 106 and the operation unit 107 is the same as in the first embodiment. In addition, the functional configuration, ink remaining amount sensing timings, and notification timings of the printer 100 are the same as in the first embodiment.

In the third embodiment, the display unit 106 of the printer 100, which is constituted by the LED lamp, cannot draw the ink remaining amount display 501 to 504 as illustrated in FIG. 5. Instead, the CPU 301 transmits information indicating the remaining amount of ink to the host instrument connected to the printer 100 through the network communication unit 304 and performs the ink remaining amount display 501 to 504 as illustrated in FIG. 5 on a display of the host instrument.

The form of connection with the host instrument is not limited to network communication but may be connection by using a non-illustrated USB interface included in the printer 100. Moreover, since the ink tank 122 has a semi-transparent window part as described above, the remaining amount of ink in the ink tank 122 can be visually checked by the user without referring to the host instrument.

Processing different between the third and first embodiments in the flowchart of FIG. 8 will be described below.

In a case where an ink remaining amount sensing timing is reached at S801, the CPU 301 of the printer 100 of the third embodiment performs the ink remaining amount sensing processing at S802. At S802, the CPU 301 calculates the ink remaining amount ratio value based on the remaining amount signal and the dot count value obtained from the ink remaining amount sensor 200 and the dot count 402.

At S803, in a case where it is determined that there is an ink color in which ink replenishment is necessary (YES at S803), the CPU 301 determines whether the current timing is a notification timing. In a case where a predetermined notification timing is reached (YES at S804), the CPU 301 executes the notification processing at S805.

In the notification processing at S805, the CPU 301 executes the flowchart illustrated in FIG. 9. In the third embodiment, the CPU 301 notifies necessity of ink replenishment by flashing the LED lamp a particular number of times in place of the notification screen display at S902. With the LED lamp, the printer 100 can perform notification of various contents other than ink replenishment notification. For example, run-out of print sheets is notified by flashing in a different number of times (flashing pattern) from a case where ink replenishment is notified.

The user checks the correspondence between the number of times of LED lamp flashing (flashing pattern) and a notification content by referring to an instruction manual or the like and performs an action necessary for each notification content.

At S903, the CPU 301 senses that a notification cancellation button is operated by the user. It is assumed that in a case where the LED lamp flashes a number of times indicating necessity of ink replenishment, the user knows the following actions as necessary actions.

(Action 1) Perform ink replenishment and press a notification cancellation button of the operation unit 107 to cancel the notification state.

(Action 2) Press the notification cancellation button of the operation unit 107 to cancel the notification state without performing ink replenishment. The notification cancellation button may be any button provided at the operation unit 107, which is different depending on apparatuses.

In a case where the notification cancellation button is operated, the CPU 301 performs ink remaining amount sensing by using the ink remaining amount sensor 200 at S904. The subsequent processing (S905 to S911) is the same as in the first embodiment.

As described above, in a case where the notification cancellation button is operated without an operation for the printer 100 to recognize whether ink is replenished by the user, ink remaining amount sensing using the ink remaining amount sensor 200 is performed and whether ink replenishment is performed can be estimated. Thus, the ink jet printing apparatus of the present disclosure can be achieved by the printer 100 of a simple apparatus configuration including a user interface of an LED and a button as in the third embodiment.

Although the third embodiment is described above with the example in which the notification processing using an LED lamp is performed in the processing of the first embodiment illustrated in the flowcharts of FIGS. 8 and 9, the notification processing using an LED lamp may be performed in the processing (FIGS. 10 and 11) of the second embodiment.

Although the embodiments of the present disclosure are described above with reference to the accompanying drawings, the present disclosure is not limited to such examples. Moreover, it should be understood that various modified examples or corrected examples that the skilled person in the art would thought of in the scope of the technical idea disclosed in the present application belong to the technical scope of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-136304, filed Aug. 24, 2023, which is hereby incorporated by reference wherein in its entirety.

What is claimed is:

1. An ink jet printing apparatus comprising:
an ink tank that stores ink and can be replenished with ink;
a head that discharges ink supplied from the ink tank;
a notification unit configured to perform notification to a user in a case where the remaining amount of ink is smaller than a first threshold value;
a cancellation unit configured to cancel a notification state by a user operation, the notification state being a state in which the notification is performed by the notification unit; and
an estimation unit configured to estimate whether ink is replenished in a case where the notification state is canceled by the cancellation unit.

2. The ink jet printing apparatus according to claim 1, further comprising
a sensor configured to output a remaining amount signal indicating whether the remaining amount of ink in the ink tank is equal to or larger than the first threshold value, wherein
the estimation unit obtains a remaining amount signal newly output by the sensor and estimates whether ink is replenished based on the obtained remaining amount signal.

3. The ink jet printing apparatus according to claim 2, wherein
the estimation unit estimates that ink is replenished in a case where the remaining amount signal obtained in a case where the notification state is canceled is a signal indicating that the remaining amount of ink in the ink tank is equal to or larger than the first threshold value, and
estimates that ink is not replenished in a case where the remaining amount signal obtained in a case where the notification state is canceled is a signal indicating that the remaining amount of ink in the ink tank is smaller than the first threshold value.

4. The ink jet printing apparatus according to claim 2, further comprising:
a counting unit configured to count the discharge amount of ink discharged from the head; and
a management unit configured to manage the remaining amount of ink based on the discharge amount of ink counted by the counting unit and the remaining amount signal obtained from the sensor, wherein
the notification unit notifies necessity of ink replenishment to the user in a case where the remaining amount of ink managed by the management unit has become smaller than a second threshold value smaller than the first threshold value.

5. The ink jet printing apparatus according to claim 2, wherein the ink tank, the sensor, the notification unit, and the estimation unit are provided for each color of ink.

6. The ink jet printing apparatus according to claim 5, wherein the notification unit performs the notification at a predetermined timing in a case where the remaining amount of ink of at least one color has become smaller than the first threshold value.

7. The ink jet printing apparatus according to claim 6, wherein after the cancellation unit cancels the notification state, the estimation unit obtains the remaining amount signals from the sensors for all colors and estimates whether ink is replenished based on the obtained remaining amount signal.

8. The ink jet printing apparatus according to claim 6, further comprising
a storage unit configured to store, as pre-cancellation remaining amount information, the value of the remaining amount signal obtained for each ink color from the corresponding sensor before the notification unit performs the notification, wherein
after the cancellation unit cancels the notification state, the estimation unit refers to the pre-cancellation remaining amount information, obtains the remaining amount signal from the sensor for an ink color the pre-cancellation remaining amount information of which indicates a value smaller than the first threshold value, and estimates whether ink is replenished based on the obtained remaining amount signal.

9. The ink jet printing apparatus according to claim 2, wherein at software-on, the sensor obtains the remaining amount signal at timings including at least any one of timings before and after execution of cleaning processing of the head, a timing after each sheet discharge, a timing after cancellation of the notification state by the cancellation unit, and a timing after job end.

10. The ink jet printing apparatus according to claim 1, wherein the remaining amount of ink is reset to a state with a predetermined amount in a case where the estimation unit estimates that ink is replenished.

11. The ink jet printing apparatus according to claim 1, further comprising a notification setting unit configured to change, in accordance with an estimation result by the estimation unit, a timing at which the notification unit performs the notification.

12. The ink jet printing apparatus according to claim 11, wherein in a case where the estimation unit estimates that ink is not replenished, the notification setting unit reduces the number of timings at which the notification unit performs the notification as compared to a case where the estimation unit estimates that ink is replenished.

13. The ink jet printing apparatus according to claim 11, wherein the notification setting unit sets the notification by the notification unit to be not performed at a particular timing in a case where the estimation unit estimates that ink is not replenished.

14. The ink jet printing apparatus according to claim 13, wherein the particular timing is a timing at which a printed object is discharged.

15. The ink jet printing apparatus according to claim 13, further comprising
a sensor configured to output a remaining amount signal indicating whether the remaining amount of ink in the ink tank is equal to or larger than the first threshold value, wherein
the notification setting unit
performs the notification to the user at predetermined timings in a case where the remaining amount of ink is smaller than the first threshold value,
does not perform the notification at the particular timing until a signal indicating that the remaining amount signal from the sensor is equal to or larger than the first threshold value is obtained after the estimation unit estimates that ink is not replenished, and
sets the notification to be performed at all the predetermined timings including the particular timing in a case where a signal indicating that the remaining amount signal from the sensor is equal to or larger than the first threshold value is obtained.

16. The ink jet printing apparatus according to claim 1, further comprising:

a processing interruption unit configured to interrupt processing being executed in a case where the notification unit performs the notification; and a resumption unit configured to resume processing interrupted by the processing interruption unit after the cancellation unit cancels the notification state.

17. The ink jet printing apparatus according to claim 1, wherein at a timing at which the cancellation unit cancels the notification state, the notification unit does not perform the notification irrespective of an estimation result by the estimation unit.

18. The ink jet printing apparatus according to claim 1, wherein the notification unit performs the notification with an LED lamp, and the cancellation unit cancels the notification state by a button operation.

19. A method of managing the remaining amount of ink in an ink jet printing apparatus including an ink tank that stores ink and can be replenished with ink and a head that discharges ink supplied from the ink tank, the method comprising:

performing notification to a user in a case where the remaining amount of ink is smaller than a first threshold value;

canceling a notification state by a user operation, the notification state being a state in which the notification is performed; and estimating whether ink is replenished in a case where the notification state is canceled.

20. A non-transitory computer readable storage medium storing a program which causes a computer to execute a method of managing the remaining amount of ink in an ink jet printing apparatus including an ink tank that stores ink and can be replenished with ink and a head that discharges ink supplied from the ink tank, the method comprising:

performing notification to a user in a case where the remaining amount of ink is smaller than a first threshold value;

canceling a notification state by a user operation, the notification state being a state in which the notification is performed; and estimating whether ink is replenished in a case where the notification state is canceled.

* * * * *